(12) United States Patent
Tsai et al.

(10) Patent No.: US 11,146,977 B2
(45) Date of Patent: Oct. 12, 2021

(54) METHOD OF MAINTAINING THE CONTINUITY OF TRANSMISSION SERVICE AND SERVICE CENTER

(71) Applicant: Industrial Technology Research Institute, Hsinchu (TW)

(72) Inventors: Chang-Lan Tsai, Hsinchu County (TW); Wan-Yi Lin, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 87 days.

(21) Appl. No.: 16/673,984

(22) Filed: Nov. 5, 2019

(65) Prior Publication Data

US 2021/0105641 A1   Apr. 8, 2021

(30) Foreign Application Priority Data

Oct. 5, 2019   (TW) .................................. 108136186

(51) Int. Cl.
*H04W 24/08* (2009.01)
*H04W 72/00* (2009.01)
(Continued)

(52) U.S. Cl.
CPC ........... *H04W 24/08* (2013.01); *H04L 12/185* (2013.01); *H04W 4/08* (2013.01); *H04W 16/22* (2013.01);
(Continued)

(58) Field of Classification Search
CPC . H04J 1/04; H04L 5/0057; H04L 5/14; H04L 47/14; H04L 47/15; H04W 28/0268;
(Continued)

(56) References Cited

U.S. PATENT DOCUMENTS 9,131,350 B2   9/2015   Balasubramanian et al.
9,161,276 B2   10/2015  Wang et al.
(Continued)

FOREIGN PATENT DOCUMENTS

CN   104838661   8/2015
CN   104918204   9/2015
(Continued)

OTHER PUBLICATIONS

"Office Action of Japan Counterpart Application", dated Feb. 2, 2021, p. 1-p. 2.

(Continued)

*Primary Examiner* — Ayaz R Sheikh
*Assistant Examiner* — Louis Samara
(74) *Attorney, Agent, or Firm* — JCIPRNET

(57) ABSTRACT

The present disclosure provides a method of maintaining the continuity of a transmission service and a service center. The method includes: receiving a consumption report from a user equipment, wherein the user equipment receives a first transmission service through a first bearer; in response to receiving a specific request, obtaining user identification information of the user equipment from the specific request; accessing the consumption report corresponding to the user equipment based on the user identification information, and obtaining first service information of the first transmission service from the consumption report; and controlling the user equipment to switch to use a second bearer to receive a second transmission service according to the first service information, wherein the first bearer is one of a unicast bearer and a broadcast bearer, and the second bearer is another of the unicast bearer and the broadcast bearer.

20 Claims, 7 Drawing Sheets

(51) Int. Cl.
*H04W 4/08* (2009.01)
*H04L 12/18* (2006.01)
*H04W 16/22* (2009.01)
*H04W 36/18* (2009.01)
*H04W 36/00* (2009.01)
*H04W 76/40* (2018.01)

(52) U.S. Cl.
CPC ... *H04W 36/0007* (2018.08); *H04W 36/0055* (2013.01); *H04W 36/18* (2013.01); *H04W 72/005* (2013.01); *H04W 76/40* (2018.02)

(58) Field of Classification Search
CPC . H04W 28/10; H04W 72/0453; H04W 80/02; H04W 84/12; H04W 76/40; H04W 72/005; H04W 24/08; H04W 36/08; H04W 36/24; H04W 4/06; H04N 21/2668
See application file for complete search history.

(56) References Cited

U.S. PATENT DOCUMENTS

| | | | |
|---|---|---|---|
| 9,883,355 | B2 | 1/2018 | Lee et al. |
| 9,900,744 | B2 | 2/2018 | Kodaypak |
| 10,009,655 | B2 | 6/2018 | Basra |
| 2007/0136459 | A1* | 6/2007 | Roche ............... H04N 21/2668 709/224 |
| 2010/0067490 | A1 | 3/2010 | Chiu |
| 2012/0320814 | A1 | 12/2012 | Chen et al. |
| 2013/0039250 | A1 | 2/2013 | Hsu |
| 2013/0039251 | A1* | 2/2013 | Wilkinson ........ H04W 36/0007 370/312 |
| 2015/0009821 | A1 | 1/2015 | Sridhar et al. |
| 2016/0057732 | A1* | 2/2016 | Li ..................... H04W 36/08 370/331 |
| 2017/0374581 | A1* | 12/2017 | Dao ..................... H04W 76/40 |
| 2018/0359614 | A1 | 12/2018 | Yu et al. |
| 2019/0124679 | A1* | 4/2019 | Li ........................ H04W 4/06 |
| 2019/0387446 | A1* | 12/2019 | Xu ........................ H04W 8/14 |
| 2020/0068645 | A1* | 2/2020 | Chang ................. H04W 36/24 |
| 2020/0120452 | A1* | 4/2020 | Lohmar ................ H04L 65/80 |
| 2020/0213814 | A1* | 7/2020 | Patra ..................... H04W 24/08 |

FOREIGN PATENT DOCUMENTS

| | | |
|---|---|---|
| EP | 2200367 | 6/2010 |
| GB | 2552705 | 9/2019 |
| JP | 2012523763 | 10/2012 |
| JP | 2013520897 | 6/2013 |
| TW | I556615 | 11/2016 |
| WO | 2017128704 | 8/2017 |
| WO | 2018076280 | 5/2018 |

OTHER PUBLICATIONS

"Office Action of Taiwan Counterpart Application", dated Mar. 27, 2020, p. 1-p. 3.

Ngoc-Duy Nguyen, et al., "Service Continuity for eMBMS in LTE/LTE-Advanced Network: Standard Analysis and Supplement", The 11th Annual IEEE CCNC, Jan. 10-13, 2014, pp. 219-224.

Mohammed Algharem, et al., "Multicast Resource Allocation with Opportunistic Scheduling in LTE Networks", Elektronika Ir Elektrotechnika, vol. 24, No. 5, Oct. 2018, pp. 1-11.

Rafael Kaliski, et al., "Dynamic Resource Allocation Framework for MooD (MBMS Operation On-Demand)", IEEE Transactions on Broadcasting, vol. 62, No. 4, Dec. 2016, pp. 903-917.

Antonios Alexiou, et al., "Efficient MCS Selection for MBSFN Transmissions over LTE Networks", 2010 IFIP Wireless Days, Oct. 20-22, 2010, pp. 1-5.

Abdennaceur Ghandri, et al., "Adaptive MBSFN subframe allocation scheme for VBR video streaming over LTE-A networks", Transactions on Emerging Telecommunications Technologies, Sep. 1, 2018, pp. 1-14.

Yi Ren, et al., "Impacts of S1 and X2 Interfaces on eMBMS Handover Failure: Solution and Performance Analysis", IEEE Transactions on Vehicular Technology, vol. 67, No. 7, Jul. 2018, pp. 6599-6614.

* cited by examiner

METHOD OF MAINTAINING THE CONTINUITY OF TRANSMISSION SERVICE AND SERVICE CENTER

CROSS-REFERENCE TO RELATED APPLICATION

This application claims the priority benefit of Taiwan application no. 108136186, filed on Oct. 5, 2019. The entirety of the above-mentioned patent application is hereby incorporated by reference herein and made a part of this specification.

TECHNICAL FIELD

The disclosure relates to a method of providing transmission service, and more particularly, to a method of maintaining the continuity of transmission service and a service center.

BACKGROUND

With improved wireless network signal coverage and transmission rate, a variety of application services are generated with multimedia audio and video content occupying a large amount of bandwidth requirements. Currently, most of user equipments (UEs) download multimedia audio and video content in a Point-to-Point (PTP) manner, which is also referred as a unicast mode. In the unicast mode, each transmission is only provided to one specific user equipment. In this case, transmission data required by each of the user equipments will occupy a wired resource and a wireless network resource. In the emerging applications of the online community, users can watch live audio and video content, and if the unicast mode is used to provide related transmission services, the same audio and video content will be transmitted to all the user equipments at the same time. Once the number of the user equipments exceeds a network capacity (e.g., a maximum network bandwidth of one base station (BS)), data transmission congestion will lead to bad results including video pause, image quality degradation, disconnection, and service crash.

In addition to the unicast mode, there is currently a mode of transmitting in a Point-to-Multipoint (PTM) manner, which may also be referred to as a broadcast mode. In the broadcast mode, each transmission of content can be received by all the user equipments, and the number of the user equipments able to receive the content is basically unlimited. For applications that need to be simultaneously transmitted, such as live video, live sports events, public TV live broadcasts, and road information, traffic conditions, map updates or the like in car networking applications, the broadcast mode can have excellent wireless resource usage efficiency.

A transmission range of the broadcast mode is usually set to a fixed value. In this way, the broadcast mode can achieve better frequency spectrum use efficiency and a coverage that is not frequently changed but only at places with more user needs. However, at places with less user needs, the transmission service is generally not provided in the broadcast mode, and most of the transmission services can only be provided in the unicast mode.

Since most of general user equipments (such as a mobile phone) have a certain degree of mobility in general, if a service provider does not adjust the manner of providing the transmission service accordingly when the user equipment leaves a range of a broadcast service and enters a range of a unicast service, the user equipment may not be able to continuously receive the transmission service. Similarly, when the user equipment leaves the range of the unicast service and enters the range of the broadcast service, if the service provider does not adjust the manner of providing the transmission service accordingly, the newly added (video) unicast service may result in an insufficient bandwidth of the base station.

Therefore, it is an important issue for those skilled in the art to design a mechanism that can maintain the continuity of transmission service in the above scenarios.

SUMMARY

Accordingly, the disclosure proposes a method of maintaining the continuity of transmission service and a service center that can be used to solve the above technical problems.

The disclosure provides a method for maintaining the continuity of transmission service adapted for a service center, including: receiving a consumption report from a user equipment, wherein the user equipment receives a first transmission service through a first bearer; in response to receiving a specific request, obtaining user identification information of the user equipment from the specific request; wherein the specific request indicates that the user equipment is handed over from a first base station to a second base station, and a coverage of the second base station only supports a second transmission service; accessing the consumption report corresponding to the user equipment based on the user identification information, and obtaining first service information of the first transmission service from the consumption report; and controlling the user equipment to switch to use a second bearer to receive the second transmission service according to the first service information, wherein the first bearer is one of a unicast bearer and a broadcast bearer, and the second bearer is another of the unicast bearer and the broadcast bearer.

The disclosure provides a service center including a content storage unit, a transceiver, a user database and a processor. The content storage unit which stores a transmission service content from a content provider. The transceiver receives a consumption report from a user equipment, wherein the user equipment receives a first transmission service through a first bearer. The processor is coupled to the transceiver, the content storage unit and the user database and configured for: in response to the transceiver receiving a specific request, obtaining user identification information of the user equipment from the specific request; wherein the specific request indicates that the user equipment is handed over from a first base station to a second base station, and a coverage of the second base station only supports a second transmission service; accessing the consumption report corresponding to the user equipment based on the user identification information, and obtaining first service information of the first transmission service from the consumption report; and controlling the user equipment to switch to use a second bearer to receive the second transmission service according to the first service information, wherein the first bearer is one of a unicast bearer and a broadcast bearer, and the second bearer is another of the unicast bearer and the broadcast bearer.

Based on the above, when the user equipment moves from the transmission range of the first transmission service to the transmission range that only supports the second transmission service, the method and the service center proposed by the disclosure can correspondingly adjust the bearer used by the user equipment for receiving the transmission service so the user equipment can continuously receive the transmission service after the handover.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION

Figure 1:
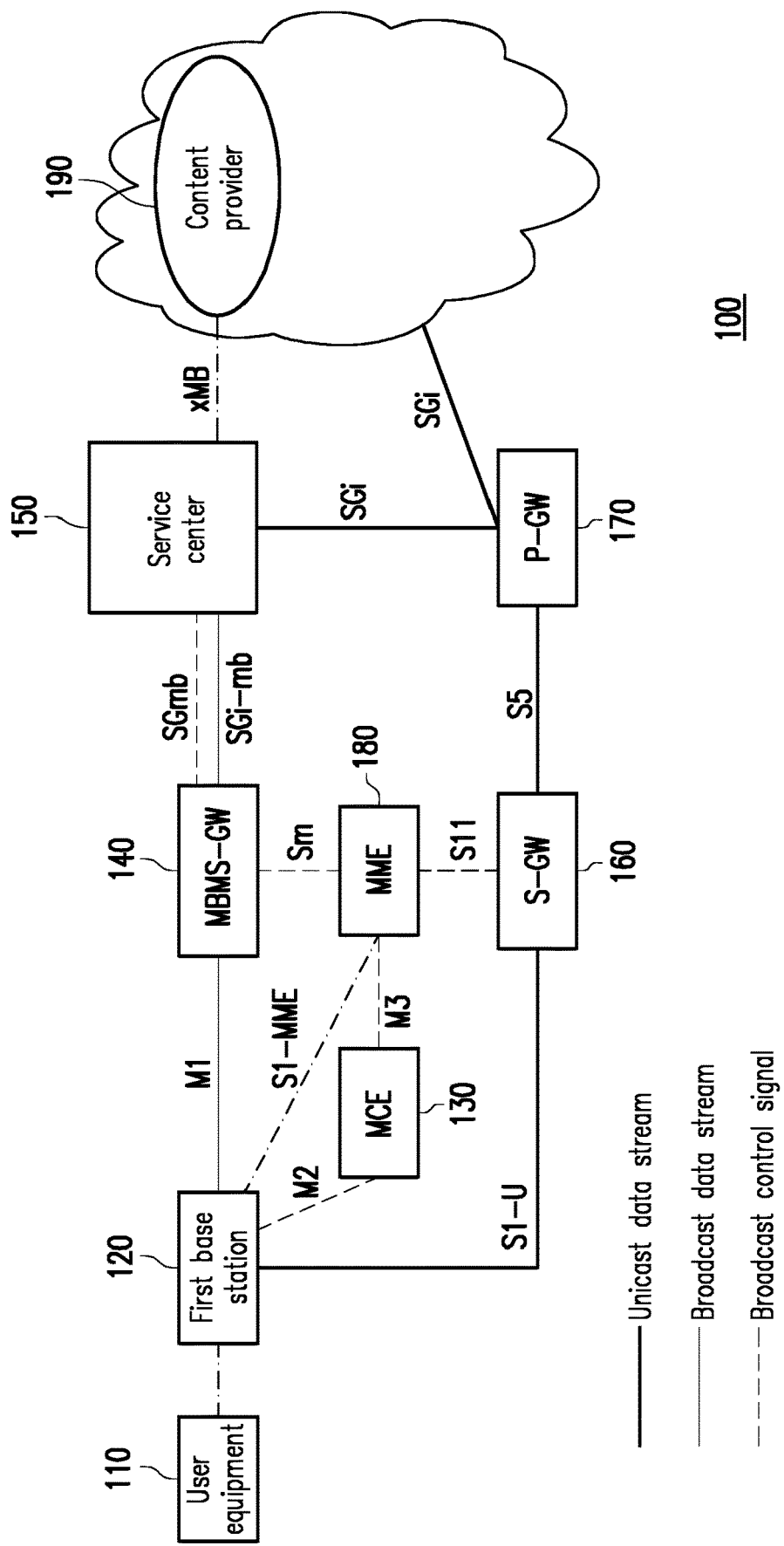
FIG. 1 is a schematic diagram illustrating a transmission service providing system according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Referring to FIG. 1, FIG. 1 is a schematic diagram illustrating a transmission service providing system according to an embodiment of the disclosure. As shown in FIG. 1, a system 100 includes a user equipment 110, a first base station 120, a multicell/multicast coordination entity (MCE) 130, a multimedia broadcast/multicast service gateway (MBMS-GW) 140, a service center 150, a serving gateway (S-GW) 160, a packet data network gateway (P-GW) 170, a mobility management entity (MME) 180 and a content provider 190. In an embodiment, the service center 150 is, for example, a broadcast/multicast service center (BM-SC).

In an embodiment of the disclosure, each of the devices/entities/gateways in FIG. 1 may be connected to each other in the manner as shown, and may communicate with each other through various interfaces as shown (e.g., M1, M2, M3, S1-MME, S1-U, Sm, S5, S11, SGmb, SGi-mb, xMB and SGi interfaces). Further, the basic operation mode and description of each of the devices/entities/gateways/interfaces in FIG. 1 may be referred to related specifications (e.g., long term evolution (LTE) Releases 11 and 12, or the like).

In the embodiment of FIG. 1, the content provider 190 may be used to provide a service (e.g., various audio and video content). The service may be transmitted by the service center 150 and provided to the user equipment 110 in a form of a unicast service or a broadcast service. For instance, if the user equipment 110 is configured to be used for receiving the broadcast service, after receiving a related data stream of the service from the content provider 190, the service center 150 may request the MBMS-GW 140 to transmit the corresponding broadcast service through a broadcast bearer. In an embodiment of the disclosure, the broadcast bearer may be, for example, an MBMS bearer, but not limited thereto. Correspondingly, the service center 150 may request the user equipment 110 to receive the broadcast service provided by the MBMS-GW 140 from the first base station 120 through the broadcast bearer. In this example, since the service center 150 provides the broadcast service, multiple user equipments may simultaneously receive the broadcast service through the same broadcast bearer.

On the other hand, if the user equipment 110 is configured to be used for receiving the unicast service, after receiving a related data stream of the service from the content provider 190, the service center 150 may transmit the data stream to the first base station 120 that serves the user equipment 110 through the P-GW 170 and the S-GW 160, so as to request the first base station 120 to provide the unicast service to the user equipment 110 through a specific unicast bearer. Correspondingly, the service center 150 may request the user equipment 110 to receive the unicast service through the unicast bearer. In this example, since the service center 150 provides the unicast service, the unicast bearer is dedicated to the user equipment 110.

In a different embodiment, regardless of whether a transmission service received by the user equipment 110 is the broadcast service or the unicast service, the user equipment 110 may report a consumption report to the service center 150 regularly or irregularly. The consumption report may include, for example, related service information of the transmission service described above.

According to LTE Release 12, the service information recorded in the consumption report may include service identification information, a consumption type, user identification information of the user equipment 110, a report time, and a report location. The service identification information may specifically indicate, for example, which service (e.g., a live video, a live broadcast of a sports event, a public TV live broadcast or the like) is the transmission service corresponding to.

The consumption type in the consumption report may indicate, for example, one of many predefined types. For instance, if the transmission service received by the user equipment 110 is the broadcast service, the corresponding consumption type may indicate "consumption of the MBMS User Service on the MBMS bearer". As another example, if the transmission service received by the user equipment 110 is the unicast service, the corresponding consumption type may indicate "consumption of the MBMS User Service on unicast". In brief, it can be known from the consumption type that the transmission service received by the user equipment 110 is the broadcast service or the unicast service.

However, as previously mentioned, in the case where the user equipment 110 moves from a transmission range of the broadcast service to a transmission range that only support the unicast service or moves from the transmission range of the unicast service to the transmission range that supports the broadcast service, if the manner of providing the transmission service is not adjusted, the continuity of the transmission service may not be maintained and the user of the user equipment 110 may feel a poor experience due to signal disruption.

Accordingly, the disclosure proposes a method of maintaining the continuity of transmission service that can be used to solve the technical problems described above, and the related details are explained below.

Figure 2:
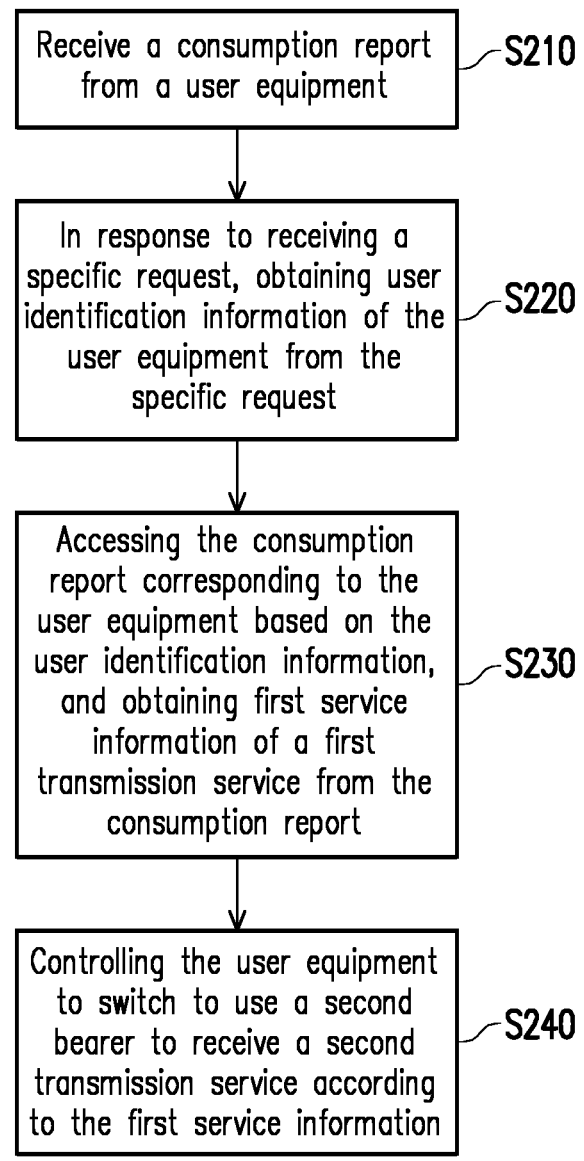
FIG. 2 is a flowchart illustrating a method of maintaining the continuity of transmission service according to an embodiment of the disclosure.

Referring to FIG. 2, FIG. 2 is a flowchart illustrating a method of maintaining the continuity of transmission service according to an embodiment of the disclosure. The method of this embodiment may be performed by the service center 150 of FIG. 1, and each step of FIG. 2 will be described with reference to the content of FIG. 1.

First of all, in step S210, the service center 150 may receive a consumption report from the user equipment 110. Here, the user equipment 110 is receiving a first transmission service through a first bearer. As mentioned above, the consumption report provided by the user equipment 110 to the service center 150 may include the service information of the first transmission service that the user equipment 110 is receiving.

In a different embodiment, the manner in which the user equipment 110 receives the first transmission service through the first bearer is different depending on the first transmission service. For instance, if the first transmission service is the broadcast service, the user equipment 110 may receive the broadcast service provided by the MBMS-GW 140 from the first base station 120 through, for example, the first bearer implemented by the broadcast bearer. As another example, if the first transmission service is the unicast service, the user equipment 110 may receive the unicast service from the first base station 120 through, for example, the first bearer implemented by the unicast bearer.

In addition, during the time when the user equipment 110 receives the first transmission service (the unicast service or the broadcast service), the user equipment 110 may also send an MBMS interest indication to the corresponding serving base station (i.e., the first base station 120). According to LTE Release 11, the MBMS interest indication may be used to indicate that the user equipment 110 is receiving (or interested in receiving) the broadcast service, and the content thereof may include providing a transmission frequency of the service that the user equipment 110 is receiving (or interested in receiving). In an embodiment of the disclosure, the MBMS interest indication may be used to indicate that, when the user equipment 110 is handed over from the first base station 120 to another base station, the user equipment 110 intends to continuously receive (or is interested in receiving) the broadcast service after the handover, but not limited thereto.

In addition, the user equipment 110 may continuously provide the first base station 120 a measurement report for signal quality of nearby base stations as a reference for the first base station 120 to determine whether to hand over the user equipment 110 to the other base stations. In an embodiment, assuming that the user equipment 110 moves from a coverage of the first base station 120 to a coverage of a second base station, the first base station 120 may determine that the user equipment 110 needs to be handed over to the second base station based on the measurement report of the user equipment 110.

In this case, the first base station 120 may transmit, to the second base station and the MME 180, a handover request for handing over the user equipment 110 to the second base station, and may correspondingly transmit a handover command to the user equipment 110. Then, in response to the handover command, the user equipment 110 may transmit a handover confirm message to the second base station, so as to be handed over to the second base station. Correspondingly, the second base station may transmit, to the MME 180, a handover notification associated with the fact that the user equipment 110 is handed over to the second base station.

In an embodiment, assuming that the coverage of one of the first base station 120 and the second base station does not support the first transmission service (e.g., the broadcast service or the unicast service) that the user equipment 110 is receiving, the method of the disclosure can maintain the continuity of transmission service after the user equipment 110 is already handed over to the second base station through subsequent steps S220 to S240.

Specifically, after the MME 180 receives the handover notification from the second base station, the MME 180 may send a specific request to the MBMS-GW 140 so as to forward the specific request to the service center 150 by the MBMS-GW 140. In an embodiment, the specific request is, for example, a user plane request, which may include the user identification information of the user equipment 110 and may indicate that the user equipment 110 is already handed over from the first base station 120 to the second base station.

Accordingly, in step S220, in response to receiving the specific request, the service center 150 may obtain the user identification information of the user equipment 110 from the specific request. Here, the specific request indicates that the user equipment 110 is already handed over from the first base station 120 to the second base station, and the coverage of the second base station only supports a second transmission service.

Then, in step S230, the service center 150 may access the consumption report corresponding to the user equipment 110 based on the user identification information, and obtain first service information of the first transmission service from the consumption report. That is to say, after knowing that the user equipment 110 is already handed over to the second base station, the service center 150 may search and obtain the consumption report associated with the first transmission service previously reported by the user equipment 110, and from therein, locate the first service information of the first transmission service received by the user equipment 110. The first service information is, for example, the service identification information of the first transmission service, the consumption type (which indicates that the first transmission service is the unicast service or the broadcast service), the user identification information of the user equipment 110 (which matches the user identification information in the user plane request), the report time and the report location.

Next, in step S240, the service center 150 may control the user equipment 110 to switch to use a second bearer to receive the second transmission service according to the first service information. In an embodiment of the disclosure, the second bearer may be relative to the first bearer, and the second transmission service may also be relative to the first transmission service.

For instance, if the consumption type in the first service information indicates that the first transmission service received by the user equipment 110 is the broadcast service (i.e., the first bearer is the broadcast bearer), the service center 150 may control the user equipment 110 to switch to use the unicast bearer (i.e., the second bearer) to receive the second transmission service. Further, since the first service information also includes the service identification information of the first transmission service, the service center 150 may accordingly make the content of the second transmission service (e.g., a specific live video) identical to the content of the first transmission service (i.e., the specific live video described above). In this way, the user equipment 110 within the transmission range of the second base station (which does not support the broadcast service) can continuously receive the content.

As another example, if the consumption type in the first service information indicates that the first transmission service received by the user equipment 110 is the unicast service (i.e., the first bearer is the unicast bearer), the service center 150 may control the user equipment 110 to switch to use the broadcast bearer (i.e., the second bearer) to receive the second transmission service. Further, since the first service information also includes the service identification information of the first transmission service, the service center 150 may accordingly make the content of the second transmission service (e.g., a specific sports video) identical to the content of the first transmission service (i.e., the specific sport video described above). In this way, the user equipment 110 within the transmission range of the second base station (which does not support the unicast service) can continuously receive the content.

In an embodiment, the service center 150 may transmit a bearer update request to the user equipment 110 to request the user equipment 110 to use the second bearer to receive the second transmission service.

In order to make the above concept easier to understand, the first embodiment and the second embodiment are further provided below with reference to FIG. 3.

Figure 3A:
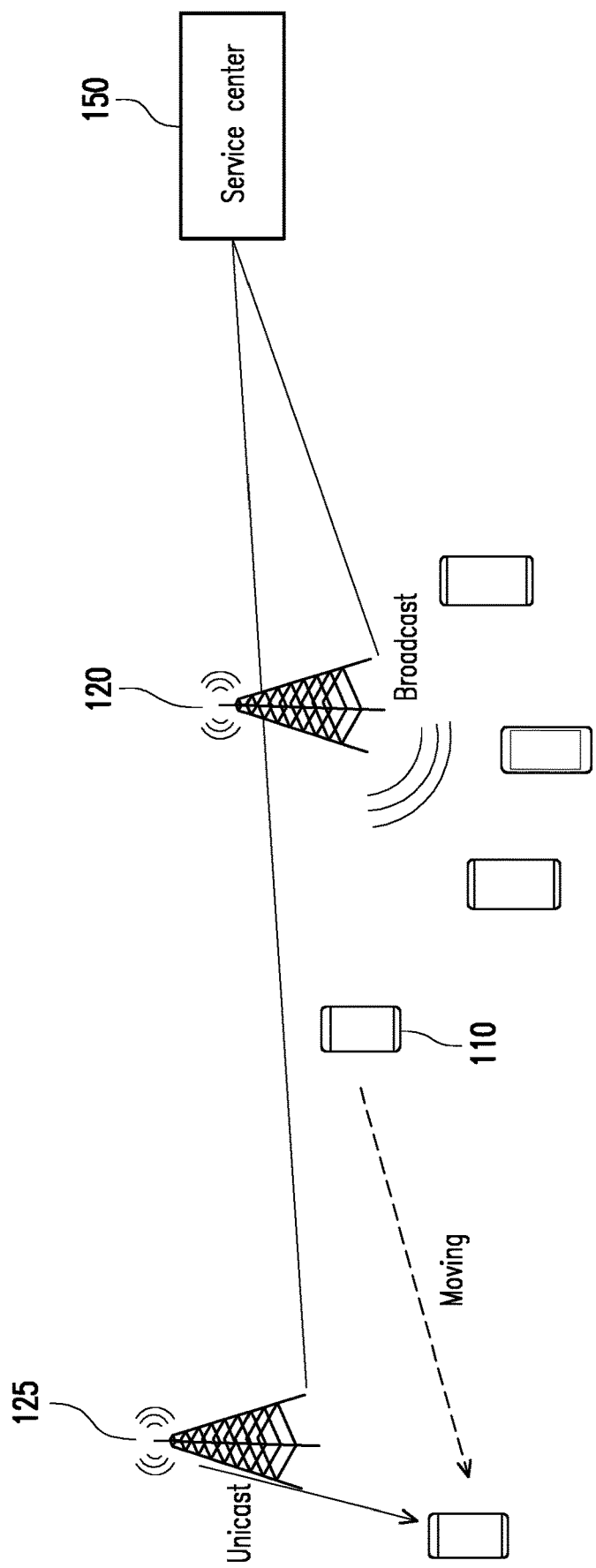
FIG. 3A is a schematic diagram illustrating a user equipment moving from a broadcast service range to a unicast service range according to a first embodiment of the disclosure.
Figure 3B:
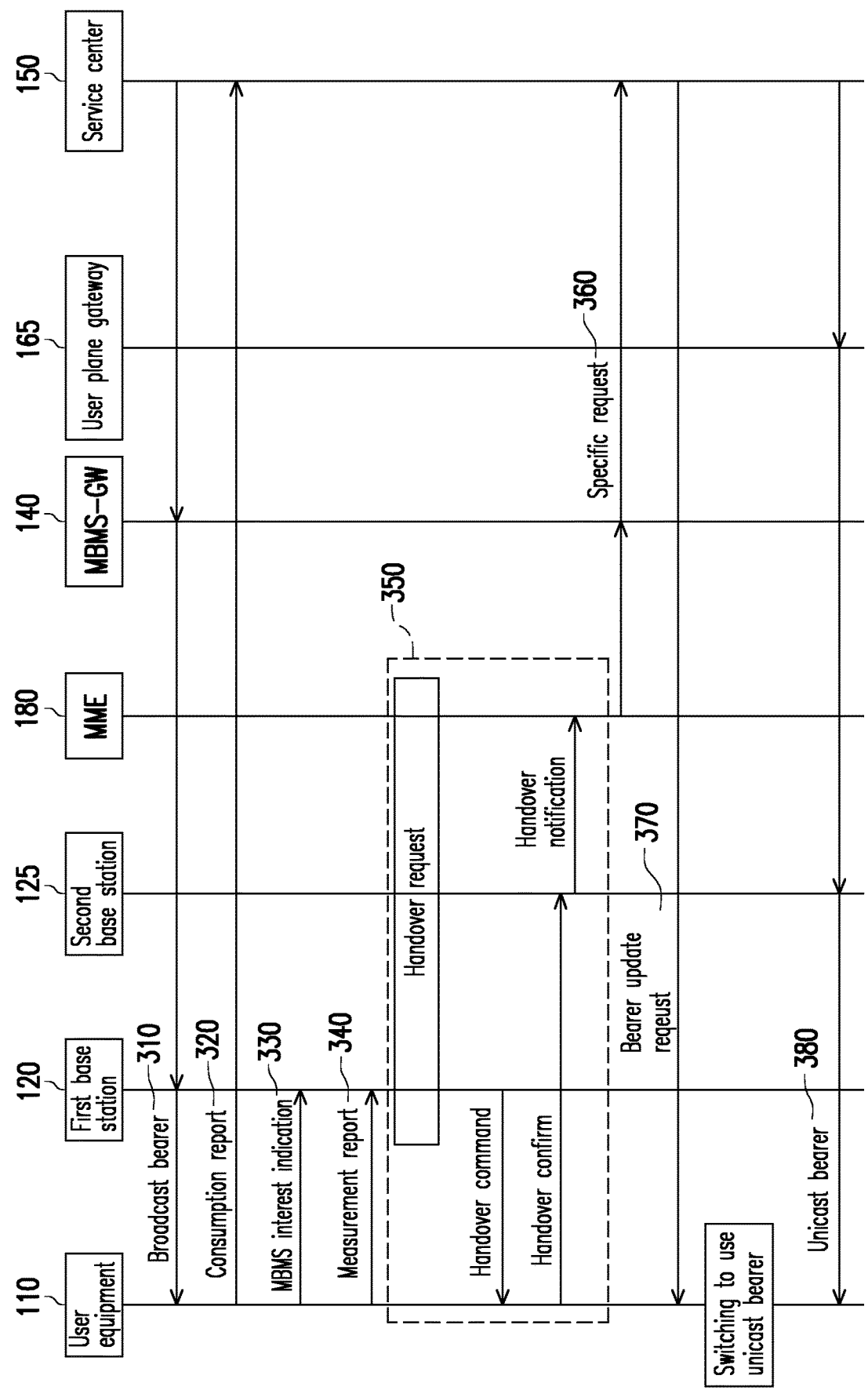
FIG. 3B is a signal transmission timing diagram illustrated according to FIG. 3A.

Referring to FIG. 3A and FIG. 3B, FIG. 3A is a schematic diagram illustrating a user equipment moving from a broadcast service range to a unicast service range according to the first embodiment of the disclosure, and FIG. 3B is a signal transmission timing diagram illustrated according to FIG. 3A.

In the first embodiment, it is assumed that the user equipment 110 is served by the first base station 120, and the user equipment 110 receives the broadcast service (i.e., the first transmission service) from the first base station 120 through a broadcast bearer 310 (e.g., the MBMS bearer). In this embodiment, the broadcast service is, for example, forwarded by the service center 150 to the first base station 120 through the MBMS-GW 140 and then provided to the user equipment 110 by the first base station 120 through the broadcast bearer 310, but the disclosure is not limited thereto.

As mentioned above, in the process of receiving the broadcast service by the user equipment 110, the user equipment 110 may report a consumption report 320 to the service center 150 regularly or irregularly, so that the service center 150 knows the consumption type (i.e., the broadcast service) and the service identification information (e.g., the specific live video) of the first transmission service received by the user equipment 110. Further, the user equipment 110 may also report an MBMS interest indication 330 to the first base station 120, so that the first base station 120 knows that the user equipment 110 is receiving the broadcast service.

In addition, the user equipment 110 may report a measurement report 340 for signal quality of nearby base stations to the first base station 120 as a reference for a handover operation subsequently performed on the user equipment 110.

In the first embodiment, it is assumed that the measurement report 340 shows that the user equipment 110 should be handed over to a second base station 125, and a coverage of the second base station 125 only supports the unicast service but does not support the broadcast service. In this case, after the user equipment 110 completes a handover operation 350 for handing over from the first base station 120 to the second base station 125 (for details, refer to the description of the foregoing embodiment and related specifications), the MME 180 may transmit a specific request 360 (e.g., the user plane request including the user identification information of the user equipment 110) to the MBMS-GW 140 so as to forward the specific request 360 to the service center 150 by the MBMS-GW 140.

Then, based on the teachings in the foregoing embodiments, after receiving the specific request 360, the service center 150 may obtain the user identification information of the user equipment 110 from the specific request 360.

Next, the service center 150 may access the consumption report 320 corresponding to the user equipment 110 based on the user identification information, and obtain first service information of the first transmission service from the consumption report 320. That is to say, after knowing that the user equipment 110 is already handed over to the second base station 125, the service center 150 may search and obtain the consumption report 320 associated with the first transmission service previously reported by the user equipment 110, and from therein, locate the first service information of the first transmission service received by the user equipment 110. The first service information is, for example, the service identification information of the first transmission service, the consumption type (which indicates that the first transmission service is the broadcast service), the user identification information of the user equipment 110 (which matches the user identification information in the user plane request), the report time and the report location.

Next, the service center 150 may control the user equipment 110 to switch to use a unicast bearer 380 to receive the second transmission service (i.e., the unicast service) according to the first service information. Specifically, the service center 150 may transmit a bearer update request 370 to the user equipment 110 to request the user equipment 110 to switch to use the unicast bearer 380 to receive the second transmission service (i.e., the unicast service).

In the first embodiment, since the consumption type in the first service information indicates that the first transmission service received by the user equipment 110 is the broadcast service, the service center 150 may control the user equipment 110 to switch to use the unicast bearer 380 to receive the unicast service. Further, since the first service information also includes the service identification information of the first transmission service, the service center 150 may accordingly make the content of the second transmission service (e.g., the specific live video) identical to the content of the first transmission service (i.e., the specific live video described above). In this way, the user equipment 110 within the transmission range of the second base station 125 (which does not support the broadcast service) can continuously receive the content.

Further, in the first embodiment, the unicast service is, for example, forwarded by the service center 150 to the second base station 125 through a user plane gateway 165 (which includes, for example, the P-GW 170 and the S-GW 160) and then provided to the user equipment 110 by the second base station 125 through the unicast bearer 380.

Figure 4A:
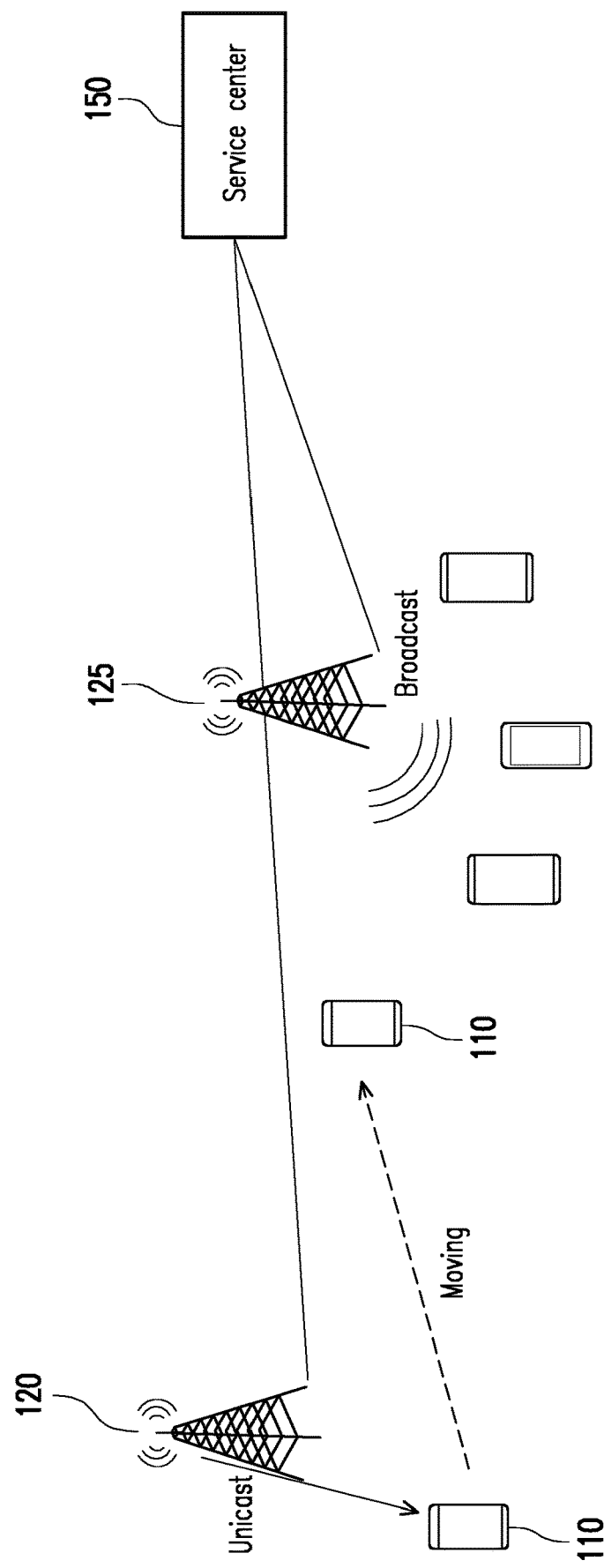
FIG. 4A is a schematic diagram illustrating a user equipment moving from a unicast service range to a broadcast service range according to a second embodiment of the disclosure.
Figure 4B:
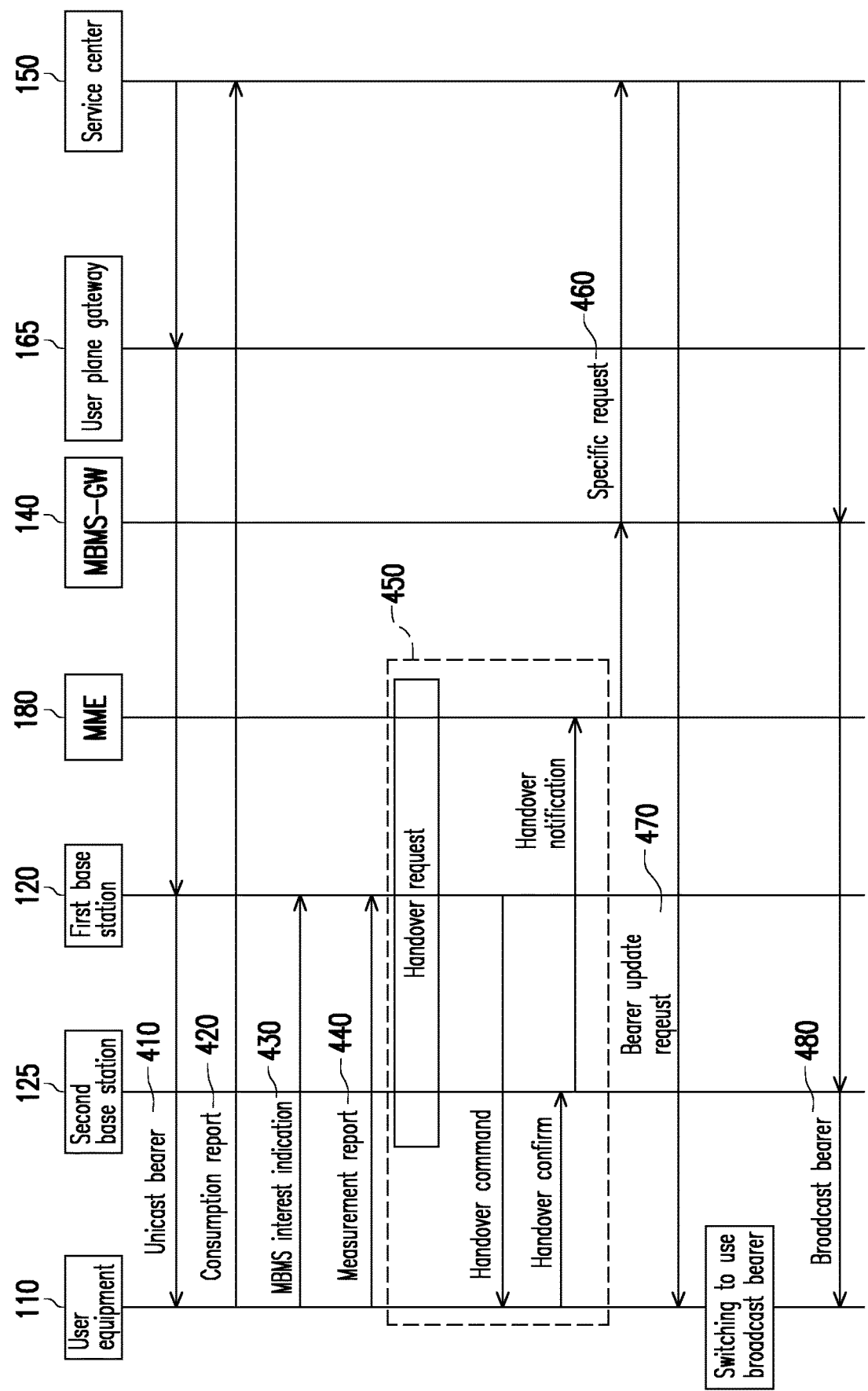
FIG. 4B is a signal transmission timing diagram illustrated according to FIG. 4A.

Referring to FIGS. 4A and 4B, FIG. 4A is a schematic diagram illustrating a user equipment moving from a unicast service range to a broadcast service range according to the second embodiment of the disclosure, and FIG. 4B is a signal transmission timing diagram illustrated according to FIG. 4A.

In the second embodiment, it is assumed that the user equipment 110 is initially served by the first base station 120, and the user equipment 110 receives the unicast service (i.e., the first transmission service) from the first base station 120 through a unicast bearer 410. In this embodiment, the unicast service is, for example, forwarded by the service center 150 to the first base station 120 through the user plane gateway 165 (which includes, for example, the P-GW 170 and the S-GW 160) and then provided to the user equipment 110 by the first base station 120 through the unicast bearer 410, but the disclosure is not limited thereto.

As mentioned above, in the process of receiving the unicast service by the user equipment 110, the user equipment 110 may report a consumption report 420 to the service center 150 regularly or irregularly, so that the service center 150 knows the consumption type (i.e., the unicast service) and the service identification information (e.g., the specific live video) of the first transmission service received by the user equipment 110. Further, the user equipment 110 may also report an MBMS interest indication 430 to the first base station 120, so that the first base station 120 knows that the user equipment 110 is interested in receiving the broadcast service.

In addition, the user equipment 110 may report a measurement report 440 for signal quality of nearby base stations to the first base station 120 as a reference for the handover operation subsequently performed on the user equipment 110.

In the second embodiment, it is assumed that the measurement report 440 shows that the user equipment 110 should be handed over to the second base station 125, and the coverage of the second base station 125 supports the broadcast service. In this case, after the user equipment 110 completes a handover operation 450 for handing over from the first base station 120 to the second base station 125 (for details, refer to the description of the foregoing embodiment and related specifications), the MME 180 may transmit a specific request 460 (e.g., the user plane request including the user identification information of the user equipment 110) to the MBMS-GW 140 so as to forward the specific request 460 to the service center 150 by the MBMS-GW 140.

Then, based on the teachings in the foregoing embodiments, after receiving the specific request 460, the service center 150 may obtain the user identification information of the user equipment 110 from the specific request 460.

Next, the service center 150 may access the consumption report 420 corresponding to the user equipment 110 based on the user identification information, and obtain first service information of the first transmission service from the consumption report 420. That is to say, after knowing that the user equipment 110 is already handed over to the second base station 125, the service center 150 may search and obtain the consumption report 420 associated with the first transmission service previously reported by the user equipment 110, and from therein, locate the first service information of the first transmission service received by the user equipment 110. The first service information is, for example, the service identification information of the first transmission service, the consumption type (which indicates that the first transmission service is the unicast service), the user identification information of the user equipment 110 (which matches the user identification information in the user plane request), the report time and the report location.

Next, the service center 150 may control the user equipment 110 to switch to use a broadcast bearer 480 to receive the second transmission service (i.e., the broadcast service) according to the first service information. Specifically, the service center 150 may transmit a bearer update request 470 to the user equipment 110 to request the user equipment 110 to switch to use the broadcast bearer 480 to receive the second transmission service (i.e., the broadcast service).

In the second embodiment, since the consumption type (in the first service information) indicates that the first transmission service received by the user equipment 110 is the unicast service, the service center 150 may control the user equipment 110 to switch to use the broadcast bearer 480 to receive the broadcast service. Further, since the first service information also includes the service identification information of the first transmission service, the service center 150 may accordingly make the content of the second transmission service (e.g., the specific live video) identical to the content of the first transmission service (i.e., the specific live video described above). In this way, the user equipment 110 within the transmission range of the second base station 125 (which does not support the unicast service) can continuously receive the content.

In addition, after the service center 150 controls the user equipment 110 to switch to use the broadcast bearer 480 to receive the broadcast service, since the user equipment 110 is already handed over from the first base station 120 to the second base station 125, the service center 150 may further control the user plane gateway 165 to stop providing the unicast service through the first base station 120 and the second base station 125.

Figure 5:
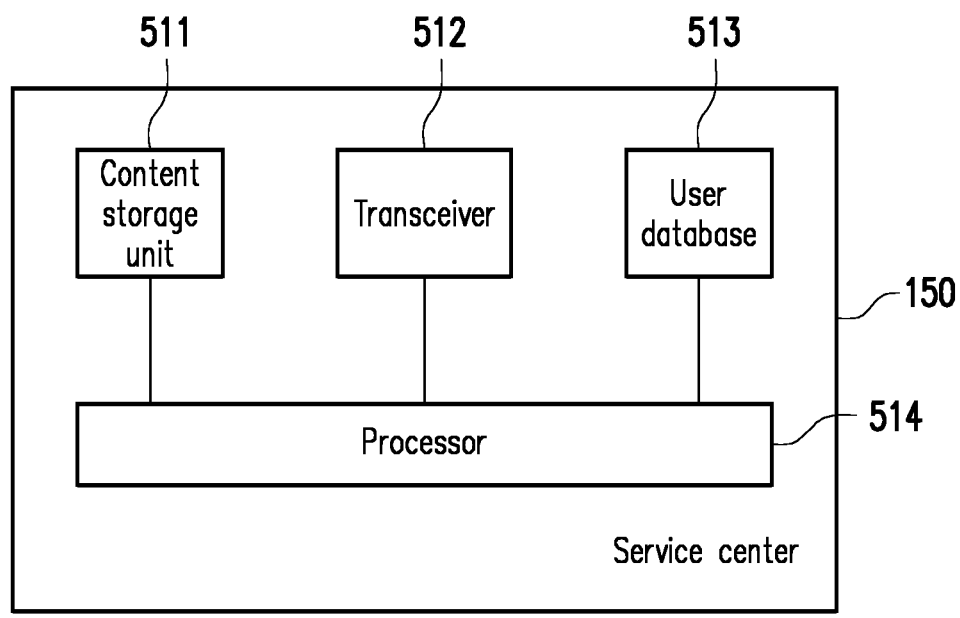
FIG. 5 is a functional block diagram illustrating a service center according to an embodiment of the disclosure.

Referring to FIG. 5, FIG. 5 is a functional block diagram illustrating a service center according to an embodiment of the disclosure. As shown in FIG. 5, the service center 150 in the present embodiment of the disclosure may include a content storage unit 511, a transceiver 512, a user database 513 and a processor 514. The processor 514 may perform the method of maintaining the continuity of transmission service by loading specific program codes and modules and collaborating with the content storage unit 511, the transceiver 512 and the user database 513.

In a different embodiment, the content storage unit 511 may be used to store a transmission service content from the content provider 190 of FIG. 1. The transceiver 512 is, for example, a component of a protocol unit which supports transmission protocols including global system for mobile communication (GSM), personal handy-phone system (PHS), code division multiple access (CDMA) system, wireless fidelity (Wi-Fi) system, worldwide interoperability for microwave access (WiMAX), or Long-Term Evolution (LTE). The user database 513 is used to store the consumption report and the user identification information, but not limited thereto.

In summary, when the user equipment moves from the transmission range of the broadcast service to the transmission range that only supports the unicast service, the method and the service center proposed by the disclosure can correspondingly adjust the bearer used by the user equipment for receiving the transmission service from the broadcast bearer to the unicast bearer so the user equipment can continuously receive the transmission service after the handover. In addition, when the user equipment moves from the transmission range of the unicast service to the transmission service that supports the broadcast service, the disclosure can also correspondingly adjust the bearer used by the user equipment for receiving the transmission service from the unicast bearer to the broadcast bearer so the user equipment can continuously receive the transmission service after the handover.

Moreover, since the mechanism of adjusting the bearer is managed by a core network end (e.g., the service center) and is not initiated by the user equipment, this mechanism can be generally used by general user equipments without any specially designed user equipment required.

It will be apparent to those skilled in the art that various modifications and variations can be made to the disclosed embodiments. It is intended that the specification and examples be considered as exemplary only, with a true scope of the disclosure being indicated by the following claims and their equivalents.

The invention claimed is:

1. A method for maintaining a continuity of transmission service adapted for a service center, comprising:
    receiving a consumption report from a user equipment currently receiving a first transmission service through a first bearer from a first base station;
    in response to receiving a specific request, obtaining user identification information of the user equipment currently receiving the first transmission service through the first bearer from the specific request; wherein the specific request indicates that the user equipment has been handed over from the first base station to a second base station, and a coverage of the second base station only supports a second transmission service different from the first transmission service;
    accessing the consumption report corresponding to the user equipment based on the user identification information, and obtaining first service information of the first transmission service from the consumption report; and
    controlling the user equipment to switch to use a second bearer to receive the second transmission service according to the first service information, wherein the first bearer is one of a unicast bearer and a broadcast bearer, the second bearer is another of the unicast bearer and the broadcast bearer, the first transmission service corresponding to the first bearer is one of a broadcast service and a unicast service, and the second transmission corresponding to the second bearer is another of the broadcast service and the unicast service.

2. The method according to claim 1, wherein the first bearer is the broadcast bearer, the first transmission service is the broadcast service, and the user equipment receives the broadcast service from the first base station through the broadcast bearer.

3. The method according to claim 2, wherein the specific request is forwarded to the service center by a mobility management entity through a broadcast/multicast service gateway, and the mobile management entity correspondingly generates the specific request after the user equipment completes a handover operation for handing over from the first base station to the second base station.

4. The method according to claim 2, wherein the second bearer is the unicast bearer, the second transmission service is the unicast service, and the method further comprises:
    controlling the second base station through a user plane gateway according to the first service information to provide the unicast service by the unicast bearer to the user equipment.

5. The method according to claim 1, wherein the first bearer is the unicast bearer, the first transmission service is the unicast service, and the user equipment receives the unicast service from the first base station through the unicast bearer.

6. The method according to claim 5, wherein the specific request is forwarded to the service center by a mobility management entity through a broadcast/multicast service gateway, and the mobile management entity correspondingly generates the specific request after the user equipment completes a handover operation for handing over from the first base station to the second base station.

7. The method according to claim 5, wherein the second bearer is the broadcast bearer, and the second transmission service is the broadcast service.

8. The method according to claim 5, wherein the unicast service is provided by a user plane gateway through the first base station, and after controlling the user equipment to switch to use the second bearer to receive the second transmission service according to the first service information, the method further comprises:
    controlling the user plane gateway to stop providing the unicast service through the first base station and the second base stations.

9. The method according to claim 1, wherein the consumption report comprises service identification information of the first transmission service, a consumption type, the user identification information of the user equipment, a report time, and a report location.

10. The method according to claim 9, wherein in response to that the first bearer is the unicast bearer, the consumption type in the consumption report indicates that the first transmission service is the unicast service; and
    in response to that the first bearer is the broadcast bearer, the consumption type in the consumption report indicates that the first transmission service is the broadcast service.

11. A service center, comprising:
    a content storage unit which stores a transmission service content from a content provider;
    a transceiver which receives a consumption report from a user equipment, currently receiving a first transmission service through a first bearer from a first base station;
    a user database; and
    a processor which is coupled to the transceiver, the content storage unit and the user database and configured for:
        in response to the transceiver receiving a specific request, obtaining user identification information of the user equipment currently receiving the first transmission service through the first bearer from the specific request; wherein the specific request indicates that the user equipment has been handed over from the first base station to a second base station, and a coverage of the second base station only supports a second transmission service different from the first transmission service;
        accessing the consumption report corresponding to the user equipment based on the user identification information, and obtaining first service information of the first transmission service from the consumption report, wherein the user identification information and the consumption report are stored in the user database; and
        controlling the user equipment to switch to use a second bearer to receive the second transmission service according to the first service information, wherein the first bearer is one of a unicast bearer and a broadcast bearer, the second bearer is another of the unicast bearer and the broadcast bearer, the first transmission service corresponding to the first bearer is one of a broadcast service and a unicast service, and the second transmission corresponding to the second bearer is another of the broadcast service and the unicast service.

12. The service center according to claim 11, wherein the first bearer is the broadcast bearer, the first transmission service is the broadcast service, and the user equipment receives the broadcast service from the first base station through the broadcast bearer.

13. The service center according to claim 12, wherein the specific request is forwarded to the service center by a mobility management entity through a broadcast/multicast service gateway, and the mobile management entity correspondingly generates the specific request after the user equipment completes a handover operation for handing over from the first base station to the second base station.

14. The service center according to claim 12, wherein the second bearer is the unicast bearer, the second transmission service is the unicast service, and the processor is further configured for:
controlling the second base station through a user plane gateway according to the first service information to provide the unicast service by the unicast bearer to the user equipment.

15. The service center according to claim 11, wherein the first bearer is the unicast bearer, the first transmission service is the unicast service, and the user equipment receives the unicast service from the first base station through the unicast bearer.

16. The service center according to claim 15, wherein the specific request is forwarded to the service center by a mobility management entity through a broadcast/multicast service gateway, and the mobile management entity correspondingly generates the specific request after the user equipment completes a handover operation for handing over from the first base station to the second base station.

17. The service center according to claim 15, wherein the second bearer is the broadcast bearer, and the second transmission service is the broadcast service.

18. The service center according to claim 15, wherein the unicast service is provided by a user plane gateway through the first base station, and the processor is further configured for:
controlling the user plane gateway to stop providing the unicast service through the first base station.

19. The service center according to claim 11, wherein the consumption report comprises service identification information of the first transmission service, a consumption type, the user identification information of the user equipment, a report time, and a report location.

20. The service center according to claim 19, wherein in response to that the first bearer is the unicast bearer, the consumption type in the consumption report indicates that the first transmission service is the unicast service; and
in response to that the first bearer is the broadcast bearer, the consumption type in the consumption report indicates that the first transmission service is the broadcast service.

* * * * *